May 14, 1963 C. R. TURNER 3,089,406
FULLY AUTOMATIC TOASTER
Filed Jan. 28, 1960 5 Sheets-Sheet 2
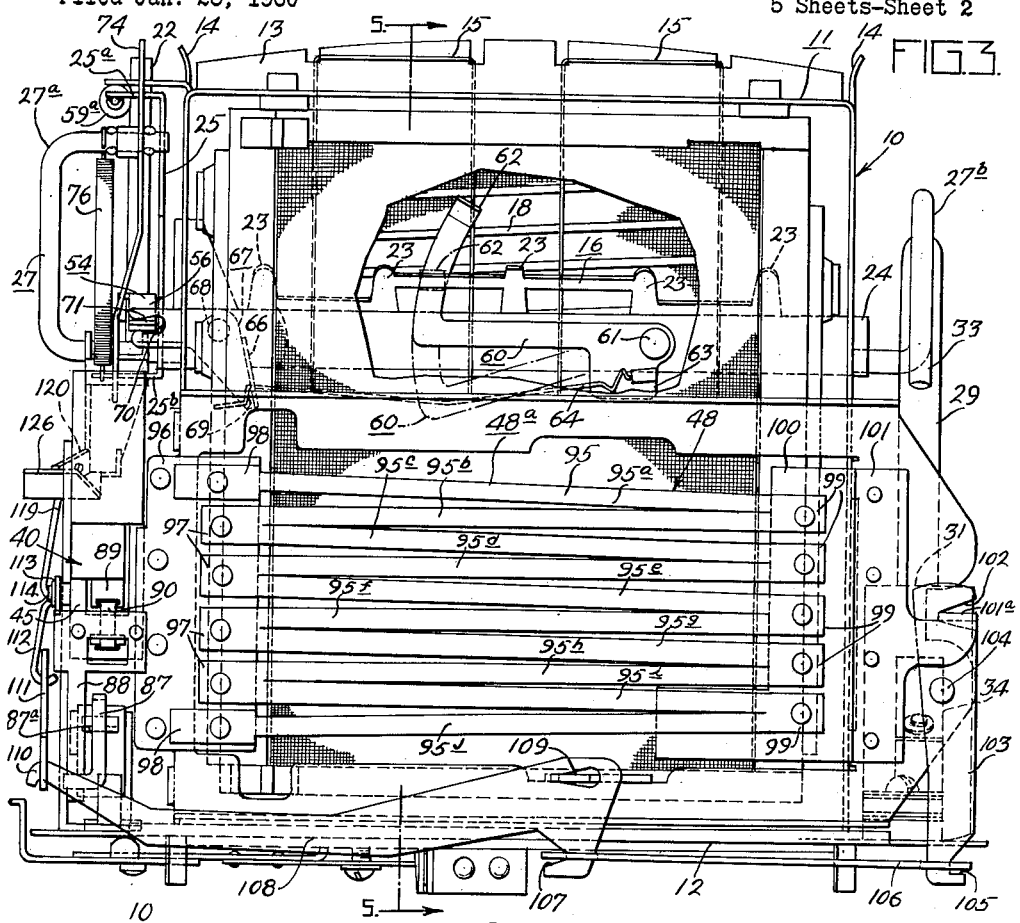
FIG.3.
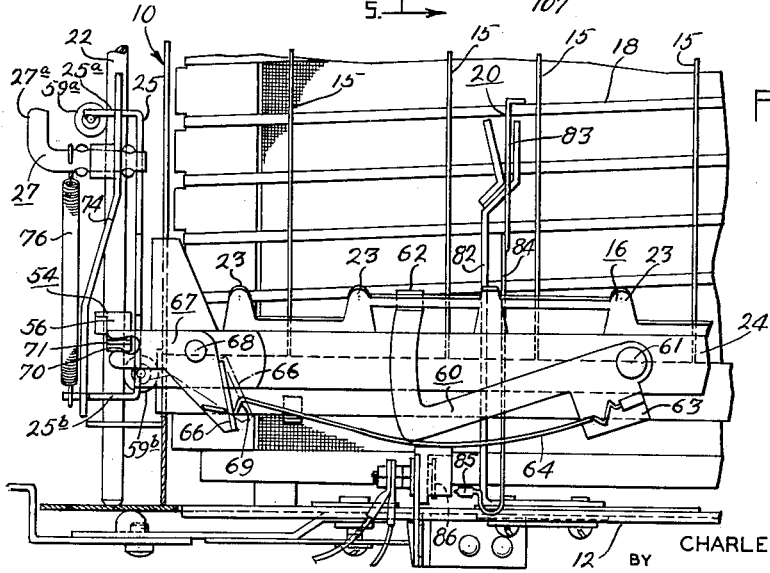
FIG.4.
FIG.4a.
INVENTOR:
CHARLES ROGER TURNER
BY Howson & Howson
ATTYS.

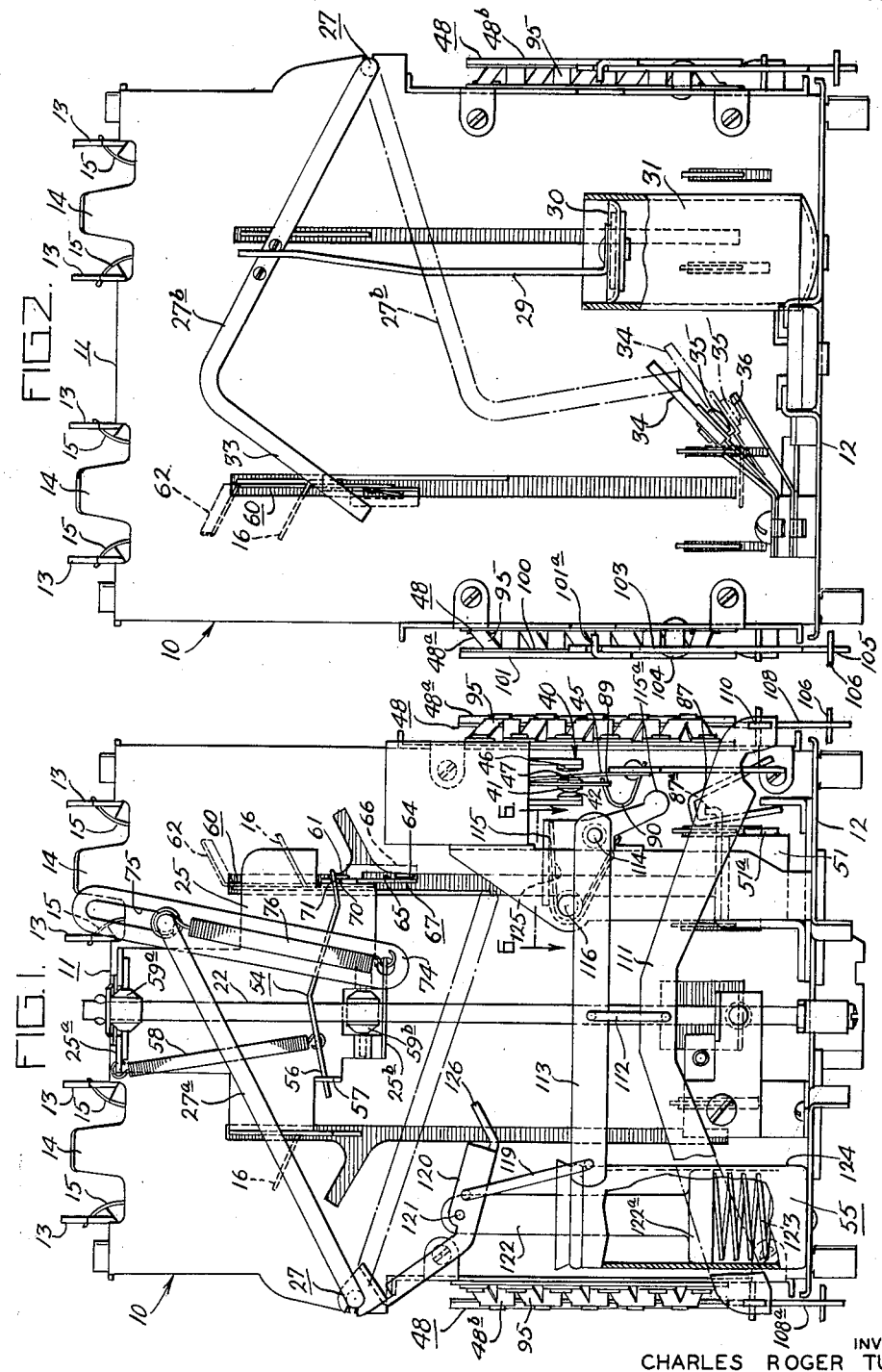

May 14, 1963
C. R. TURNER
3,089,406
FULLY AUTOMATIC TOASTER
Filed Jan. 28, 1960
5 Sheets-Sheet 3
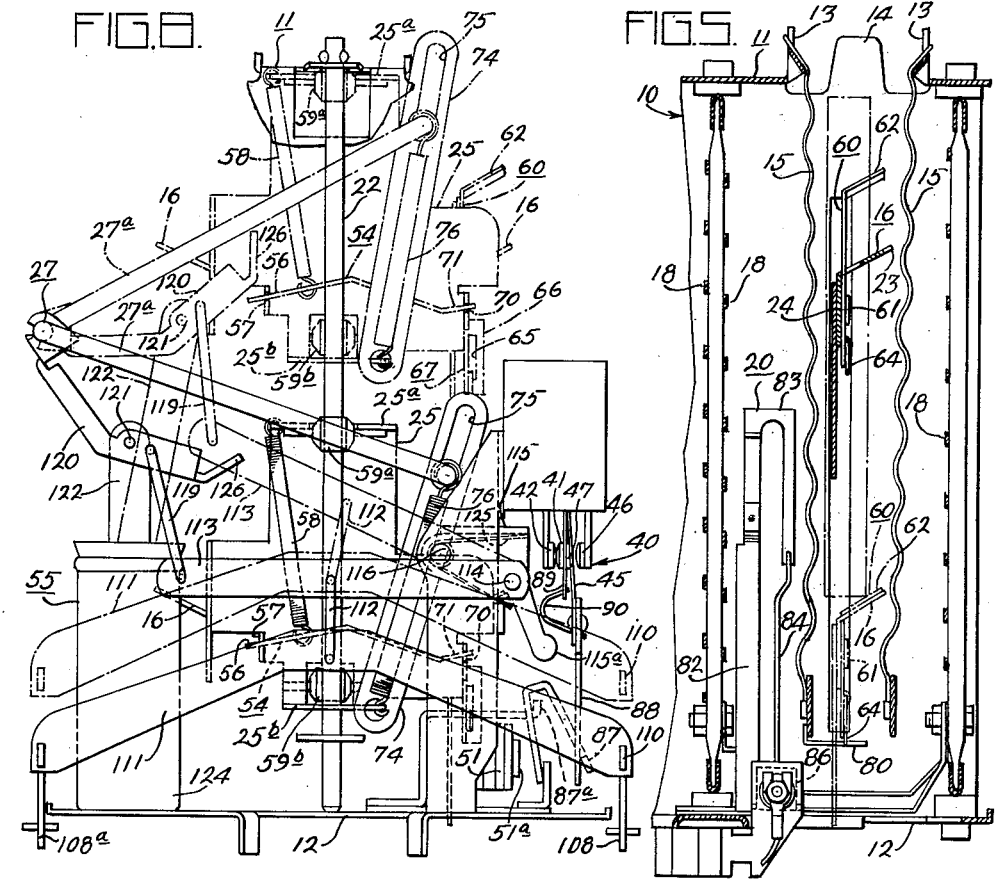
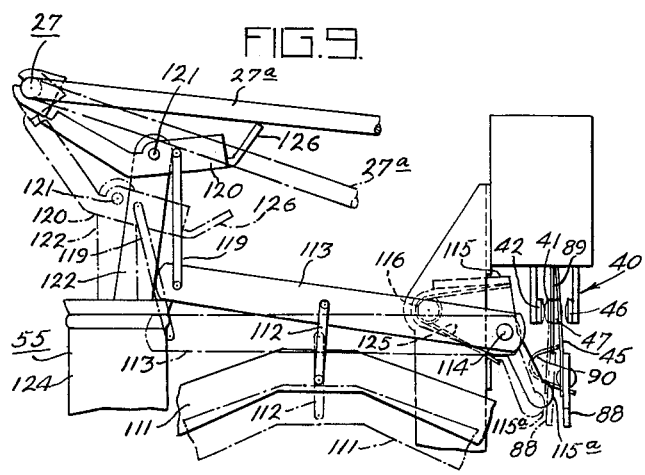
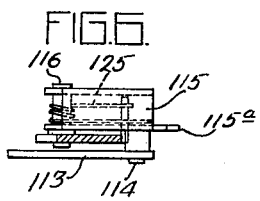
INVENTOR:
CHARLES ROGER TURNER
BY Howson & Howson
ATTYS.

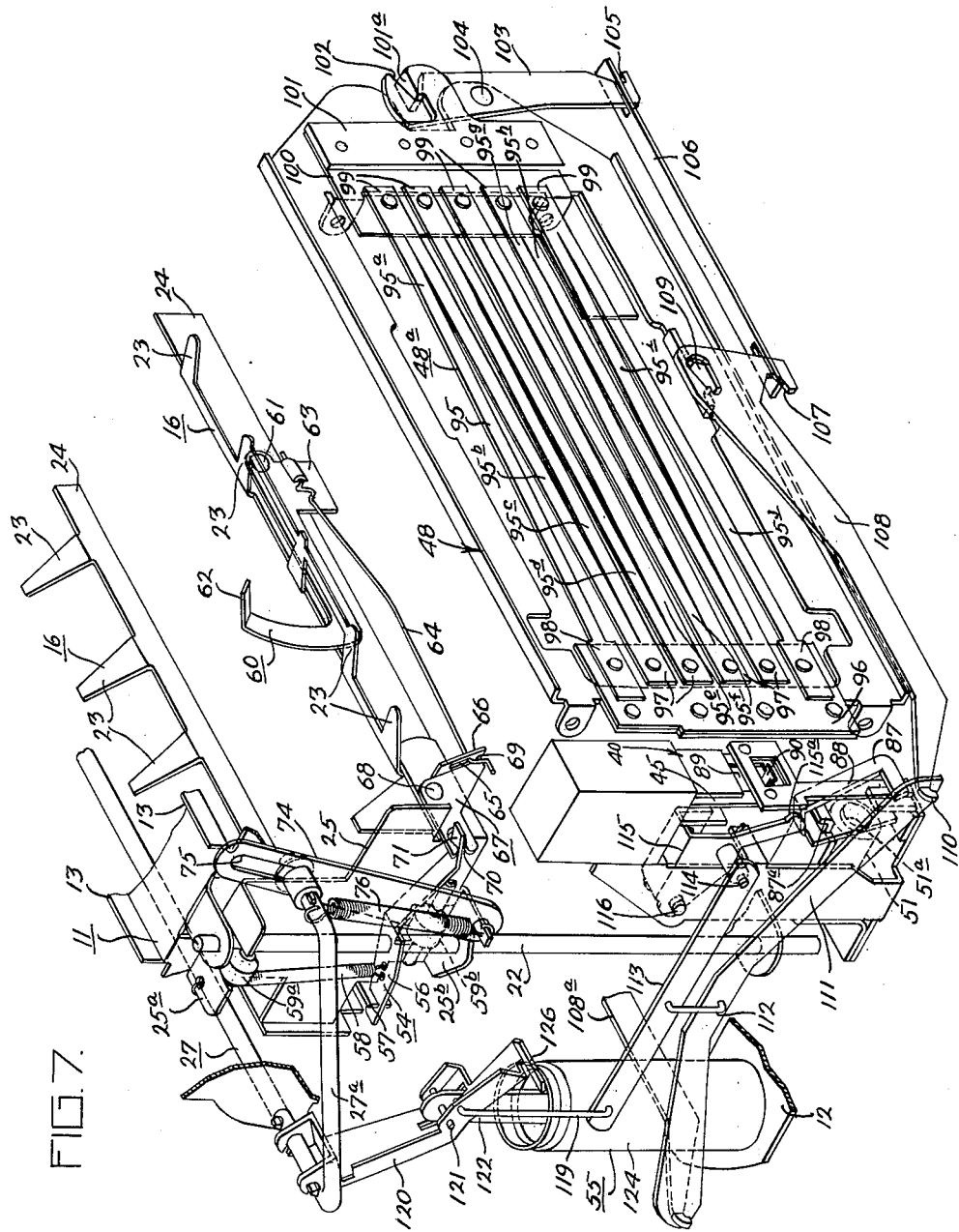

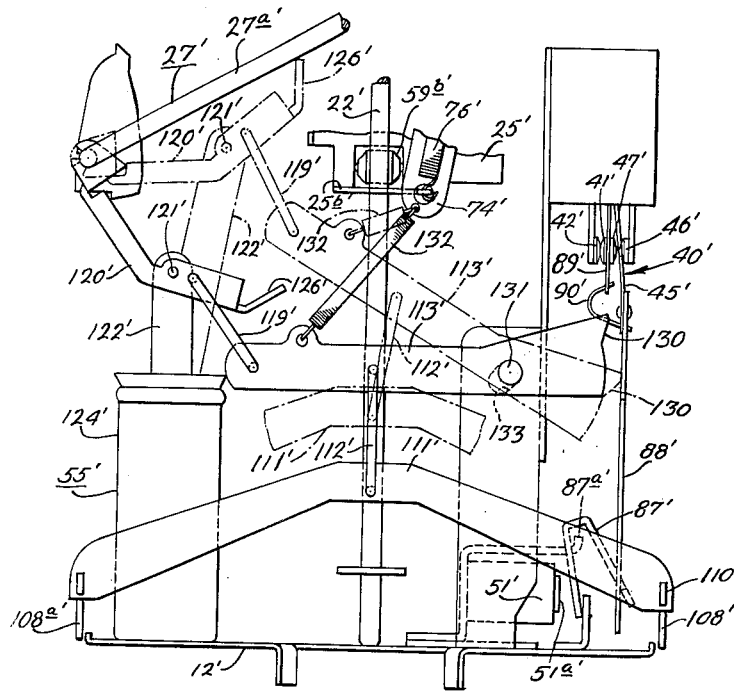
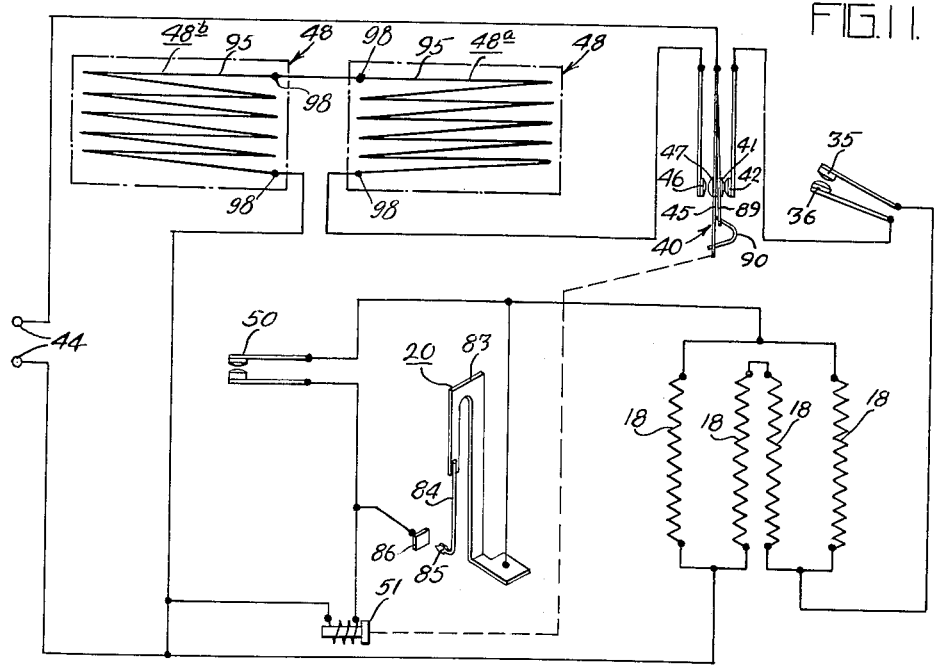

United States Patent Office 3,089,406
Patented May 14, 1963

3,089,406
FULLY AUTOMATIC TOASTER
Charles Roger Turner, Philadelphia, Pa., assignor to The Proctor-Silex Corporation, a corporation of Pennsylvania
Filed Jan. 28, 1960, Ser. No. 5,305
36 Claims. (Cl. 99—329)

This invention relates to automatic bread toasters, and more particularly to toasters of the fully automatic type which operate through a complete toasting cycle in response to the insertion of a bread slice.

In the older form of so-called automatic toasters, the bread carriage is manually lowered to toasting position, such movement stressing a spring which is utilized to return the carriage to non-toasting position after a predetermined toasting time. In some types of fully automatic toasters, motor means is provided to replace manual means to lower the carriage and to simultaneously stress the lifting spring. In others, the carriage is lowered by the force of gravity, and motor means is utilized to lift the carriage to non-toasting position. It has also been proposed to use motor means to move the carriage in both directions.

It is the object of the present invention to provide a novel and improved type of fully automatic toaster in which the bread carriage is moved to toasting position under the force of gravity, and is returned to non-toasting position by a spring which is prestressed by motor means.

It is also an object to provide an improved toaster in which the motor means is deenergized throughout a major portion of the toasting cycle.

It is a further object to provide an improved toaster of the above characteristics that utlizes a thermal motor to stress the spring.

It is also an object to provide an improved toaster of the above type which includes novel means for deenergizing the thermal motor should an obstruction prevent normal completion of its energization cycle.

It is an additional object to provide an improved fully-automatic toaster arranged to operate quietly throughout the whole cycle, with smooth and rapid movement of the carriage in both directions.

This invention is one of two different inventions that have the above advantages.

In the present application, the bread carriage is latched in non-toasting position. The insertion of a bread slice trips the latch and the carriage moves into toasting position under the force of gravity. When it reaches toasting position the heating elements are energized. After toasting is completed, a signal from the thermostatic control deenergizes the heating elements and energizes a thermal motor, which, on expansion, permits the carriage to move to non-toasting position through the energy stored in a spring. When the carriage reaches non-toasting position it is again latched and the thermal motor is deenergized, whereupon its contraction restresses the spring.

In my co-pending application, Serial Number 5,306 of even date herewith, a spring holds the bread carriage in non-toasting position. The insertion of a bread slice energizes a thermal motor, which, on expansion, permits the carriage to move into toasting position under the force of gravity without substantial change in the stressed condition of the spring. When it reaches toasting position the carriage is latched, the heating elements are energized, and the thermal motor is deenergized, whereupon a contraction of the thermal motor stores additional energy in the spring. When toasting is completed, a signal from the thermostatic control releases the latch, the heating elements are deenergized, and the carriage is moved to non-toasting position through the energy stored in the spring.

In addition to the above described aspects of novelty, some of the structure which will be described hereafter is novel. For example, the latching means provides, a simple, inexpensive, highly reliable device. Similarly, the selector switch construction is quite advantageous and the circuitry overcomes the need for a fixed neutral position. Additionally, many other of the structural devices and circuitry described hereafter involve new combinations of elements usefully combined to produce new and unexpected results.

For a better understanding of the present invention, reference is made to the following drawings, in which:

FIG. 1 is an end elevational view of the toaster from one end with the cover removed;

FIG. 2 is an end elevational view of the opposite end of the same structure;

FIG. 3 is a side elevational view partially in section of one side of the toaster;

FIG. 4 is a partial view of the toaster structure showing in some detail the latch release mechanism and the thermostat in open contact position;

FIG. 4a is a view of the same thermostat in closed contact position;

FIG. 5 is a partial sectional view taken along line 5—5 of FIG. 3;

FIG. 6 is a detail sectional view taken along line 6—6 of FIG. 1;

FIG. 7 is a perspective view showing the bread carriages and their actuating mechanism;

FIG. 8 is an end view of the toaster showing some of the mechanism of FIG. 7 in its two extreme positions;

FIG. 9 is a partial view showing the operation of the switch-tripping cam member;

FIG. 10 is a similar view showing a modified form of cam arrangement; and

FIG. 11 is a schematic wiring diagram showing electrical elements of the toaster.

Referring to the drawings, and particularly to FIGS. 1 and 2 thereof, it will be seen that the toaster illustrated is shown without its exterior casing. As shown, the internal frame or chassis, generally designated 10, provides a generally hollow rectangular framework within which are located the effective parts of the toaster including the bread-carrying carriage and the heating elements. As can be seen from FIGS. 3 and 5, in addition to the side walls the frame 10 includes top and bottom walls 11 and 12. The top wall 11 is provided with openings around which are upwardly extending flanges 13 and 14 which define the mouths of the two bread-receiving wells. The wells themselves are defined by parallel grill wires 15 of ripple form in accordance with the teaching of David Saint in U.S. Patent No. 2,847,931, dated August 19, 1958. Movable within the wells thus defined are bread racks 24 which move as a portion of carriage 16 from an upper bread-receiving and removing position, hereinafter referred to as bread-removing position, to a lower or toasting position. In the lower position of the carriage a slice of bread lies entirely within the well and in position to be exposed to the heating elements 18 on each side of the well. The heating elements may be provided by high resistance, flat metallic ribbon wound around a suitable insulated support, preferably a suitable frame covered with woven fibre glass. In the space between the heater element and one of the bread wells is provided a thermostatic switch element, here generally designated 20, preferably of the type described and claimed in U.S. Patent No. 2,667,115, dated January 26, 1954, to W. H. Vogelsberg.

As seen in FIG. 1, at one side of the toaster there is provided a vertically oriented rod 22 fixed relative to the frame at its opposite ends. A similar guide rod may be provided at the other end of the toaster frame, if desired. As seen in FIG. 7, the toaster carriage 16 is composed of two bread racks 24 including generally horizontal bread-supporting fingers 23 jointed at one of their ends by a suitable transverse end portion 25. The end portion 25 is provided at top and bottom with suitable flanges 25a and 25b which are adapted to slide on the rod 22.

The structure thus far described is much like the structure of the U.S. application of Hild et al., Serial No. 480,118, filed January 6, 1955 now Patent No. 2,951,436, issued September 6, 1960 and like that structure has a generally U-shaped rod member 27 which has a horizontal axle portion extending along one side of the toaster and supported for rotatable movement by suitable flanges. At each end of the toaster frame extending from the axle portion of the rod are provided arms which complete the U and each of which swings through an arc. At the end of the toaster shown in FIG. 1, the arm of member 27 is designated 27a and is coupled at its end through an intermediate coupling arrangement to the toaster carriage. At the other end of the toaster frame, as seen in FIG. 2, the arm denoted 27b is connected through a suitable link 29 to a piston 30 slidable within a dash-pot cylinder 31 fixed to the frame 10 to provide damping, and hence smoother, steadier movement of the carriage relative to the frame. The end of the arm 27b is bent to provide a switch- actuating portion 33. As portion 33 moves into its lower position it contacts and moves leaf element 34 to move the contact 35 into fixed contact 36. Both contacts are supported together on an assembly fixed relative to the frame. For greater detail relative to this type of structure, see the applicaion of Hild et al., Serial No. 480,118, filed January 6, 1955.

The structure thus far described is essentially like toasters in which the carriage is manually pushed downward into toasting position against a spring and upon completion of toasting the spring returns the carriage to bread-removing position. The present toaster, however, is intended to be a fully automatic toaster and employs spring means of a different form from Hild's spring which is manually stressed. In the present structure, when a slice of bread is placed into one of the wells of the toaster, it will cause the carriage to automatically lower to toasting position, toasting will proceed after the carriage is in toasting position and, thereafter, the carriage will rise to the bread-removing position and remain there.

In order to accomplish this sequence of operation, the elements shown schematically in the circuit of FIG. 11 are used in accordance with the present invention. In series with contacts 35—36 is a pair of contacts 41—42 in selector switch 40, which contacts, when positioned as shown, enable the circuit to be closed through contacts 35—36 to energize the heating elements 18 across power input terminals 44. Alternatively, the selector member 45 of switch 40 may be repositioned so that contacts 46 and 47 are closed, thus connecting a thermal motor 48, which is divided into two sections 48a and 48b, across terminals 44. As can be seen in FIG. 11, when the thermostatic switch 20 is closed, or alternatively when a manual switch 50 in parallel with switch 20 is closed, an electromagnet 51 mechanically coupled to selector member 45 of the selector switch acts to throw the selector switch to energize the thermal motor 48.

The novel aspects of the apparatus will now be considered in detail. First consideration will be given to the latching means and its associated apparatus. Thereafter attention will be given to the thermal motor and its related structure.

Although any suitable latching means releasable by the placing of a slice of bread on the bread carriage or some associated act may be used, a simple highly effective novel latching system has been devised particularly for use with the toaster of the present invention, although it may find use in other toasters. Latching means 54 depends upon the use of a slide rod parallel to the direction of carriage movement, such as rod 22. This improved latching means serves to hold the bread carriage not only at its uppermost or bread-removing position, but against downward movement from any level. Suitable means responsive to the placing of a slice of bread into one of the wells and onto the carriage releases the latching mechanism.

The preferred latching means 54 can be seen in FIG. 1 and consists of a plate 56 pivoted on a portion 57 of the bread carriage structure and provided with an aperture through which passes the rod 22. Rod 22 is fixed to the frame and extends vertically or parallel to the direction of carriage movement. The plate is located intermediate the flanges 25a and 25b, appendages of the bread carriage which are provided with suitable bearings to permit sliding of the carriage structure along rod 22. Advantageously a spring 58 or other suitable biasing means is employed to extend between the plate 56 and another portion of the bread carriage structure, in this case flange 25a. Spring 58 serves to bias the free end of plate 56 upwardly which causes the edges of the plate at the aperture to engage the rod 22 and thereby hold the carriage in place relative to the frame against downward forces. Such downward forces, in fact, tend to increase the locking effect of the plate 56 against rod 22. Motion in the upward direction is not hampered, however, because such motion is not opposed by the action of the plate 56 and is in a direction which tends to oppose spring 58 and release the locking effect of the plate.

It will be observed that in addition to the possibility of using other types of latching means with this structure this latching means may be used with modified structures including counterbalanced gravity actuated carriage structures in which the biasing effect would have to be reversed. Moreover, the effective force against which the latching means acts need not be gravity in all instances, but elsewhere may be spring effect, etc.

Referring to FIG. 3, 4 and 7, it will be seen that a generally L-shaped lever member generally designated 60 is rotatably supported relative to the bread rack 24 by a pivot pin 61 through the remote end of its longer arm. The shorter arm of the L-shaped structure is preferably in the shape of a segment of a circle having the longer arm as its radius and pin 61 as its center and is provided at its remote end with a laterally extending termination 62 intended to provide additional area transverse to the well for engagement of the bottom of a slice of bread placed in the bread well. The pivoted end of the lever also supplies the pivot for a crank having the L-shaped member as one arm and a transverse extension 63 providing the other arm. Affixed to the extension 63 is a resilient tension wire 64 which normally holds lever 60 in the position shown in solid lines. The other end of wire 64 extends generally perpendicularly through a slot 65 in flange 66 which is folded transversely to one edge and provides one arm of triangular crank member 67 which is rotatably supported on the carriage by pivot 68. Remote from the wire's connection to extension 63 and at the level of flange 66 the wire 64 is bent to provide a transverse shoulder 69 between two parallel portions, which shoulder engages the flange 66. Slot 65 is perpendicular to the plane of the wire and is of such length that the bend can pass through the slot. Ordinarily, however, the resilience of the wire 64 holds the wire 64 against the bottom of the slot 65 with shoulder 69 in the position shown in FIG. 7, so that tensional forces applied to the wire will produce counter clockwise rotation of triangular crank 67, as viewed in FIGS. 3 and 4. The other arm of crank 67 is terminated with an open-ended slot 70 which receives an extension 71 of the latching plate 56 (see FIGS. 1, 3, 4 and 6) at the end remote from that end which is pivoted to the carriage.

When a slice of bread is placed in the bread well, lever 60 is depressed to the position shown in dashed lines in FIG. 3. This, in turn, causes extension 63 in rotating counterclockwise to exert a pull on wire 64.

The engagement of the shoulder 69 against the flange enables the pull on wire 64 to rotate crank member 67 to the position relative to the carriage shown in dashed lines in FIG. 4. This rotation of crank 67 in a counterclockwise direction, as seen in FIG. 4, lowers extension 71 of latch plate 56 against the bias of latch spring 58 and causes clockwise rotation of latch plate 56 (as seen in FIG. 1) about its pivot support 57. This rotation releases the edges of the aperture of the plate from the rod 22 whereupon the carriage is free to drop under gravity until it reaches toasting position predetermined by the location of appropriate stops between carriage and frame.

This latch release arrangement may be modified considerably, the essence of the structure being opposed shoulders between a resilient tension member and a latch release-effecting portion, all located on the carriage. As will appear, associated with this structure on the carriage is a stop element on the frame which acts upon one of the engaged members to cause their shoulders to disengage. For reasons which will appear hereafter the geometry must be such that upon release of tension in the resilient tension member the shoulders will reengage.

As the carriage drops, the link 74 causes the arms 27a and 27b of rod member 27 to move from their upper solid line positions shown in FIGS. 1 and 2 to their lower dashed line positions shown in those figures. The slot 75 accommodates a transversely bent end of arm 27a, and spring 76 connects the end of arm 27a and that end of the link 74 which is pivoted to the toaster carriage structure. The purpose of this type of connection will appear hereafter. As previously described and as can be seen in FIG. 2, as the carriage lowers rod 27a, the end 33 of arm 27b will contact the actuating leaf 34 on which the contact 35 is supported and close it against fixed contact 36. Similarly, through connection 29 the plunger 30 moves into dash-pot 31.

As the carriage reaches the lower limit of its travel relative to the frame, a stop 80 fixed on the frame in position to do so engages the wire 64 and displaces it upwardly into a position where its shoulder 69 clears the bottom of slot 65 whereupon crank 67 under the urging of latch spring 58, which tends to move the free end of the latch plate 56 upward, pulls the crank 67 back to its initial position shown in solid lines in FIG. 4. The wire 64 will remain in its flexed position, as seen in FIG. 4, as long as a slice of bread is on the carriage and, therefore, cannot thereafter be effective to release the latch plate 56 again. As long as shoulder 69 is disengaged from flange 66, latch plate 56 will be urged into effective position by spring 58 so that the carriage may be raised but not again lowered until the slice of bread is removed and replaced by another slice.

As can be seen in FIG. 11, in the toasting position of the carriage if switch contacts 41, 42 are closed, the heater elements 18 are placed across the power line by virtue of closing of switch contacts 35 and 36.

As toasting progresses the thermostat seen in FIGS. 4 and 4a, as well as in FIG. 5, is effective. The thermostat 20 is preferably of a type described in U.S. Patent 2,667,115 to W. H. Vogelsberg and consists of a support arm 82 supported on the frame structure at one end and supporting at its free end a U-shaped bimetallic member 83. The free end of the leg, which responds to bread surface temperature, is attached to a rigid conductor 84 which terminates in a pointed movable contact 85 (see FIGS. 4 and 4a). A fixed contact 86 is supported on the frame of the structure. If desired, a suitable positioning means described in the U.S. Patent 2,796,492 to J. J. Lawser may be employed to adjust the position of the fixed contact to provide for different thermal conditions at contact closure.

The thermostat is arranged so that movement between its open position shown in FIG. 4 and its closed position shown in FIG. 4a will be accomplished at the time the toast is toasted to the desired degree.

Thermostat contacts 85 and 86 are in circuit with the winding of electromagnet 51 whose supporting core 51a is fixed relative to the frame. This electromagnet when energized is effective upon a U-shaped armature 87 supported relative to the frame on a pivot hook 87a. The action of the electromagnet on the armature is such as to move switch actuator 88, an extension of switch selector member 45. Selector member 45 moves under this force to open the contacts 41 and 42 and close the contacts 46 and 47. The selector switch is a double-throw, two position, snap acting switch, supported on the frame. An over-center toggle arrangement is preferably provided wherein blade 89, supported in the same plane as resilient selector member 45, is connected to actuator 88 by spring 90 which urges the members it connects apart into different planes. Therefore, when selector member 45 is moved into the plane of blade 89 the spring 90 causes a snap action causing blade 89 to move to the other side of selector member 45: Since blade 89 carries contacts 41 and 47, this snap action makes for rapid switching from one set of contacts to the other. The fixed contacts 42 and 46 are each supported on relatively fixed blades spaced apart a sufficiently small distance that the selector which supports the movable contacts will easily move its appropriate contact into its cooperating fixed position contact each time switching occurs. There is no center neutral position required or provided by this switch. The fixed blades are preferably fixed mechanically to, but electrically insulated from, blade 89. The means mechanically holding the assembly together may be a clamp around a pair of outside insulators between which are alternate metallic blades and insulators, or the holding means may be a suitable bolt, properly insulated. In operation the contacts 46, 47 are closed by action of the solenoid, and the thermal motor 48, or more specifically, the two motors 48a and 48b on the opposite sides of the toaster structure, are energized and expand.

We turn now to the actuation system which enable automatic raising of the bread carriage in the specific embodiment illustrated. The thermal motors 48a and 48b on opposite sides of the toasters, as seen in FIGS. 1 and 2, are employed in combination with suitable linkage elements to compress a coil spring 123 when the motors are deenergized and contracted. As the thermal motors expand, when energized the coil spring is released thereby allowing its stored energy to raise the carriage in a manner which will be described.

The nature of the thermal motors can be understood by reference to FIGS. 3 and 7 which actually illustrate thermal motor 48a, which is identical in function but inverse in arrangement with thermal motor 48b on the other side of the toaster. The active element of the thermal motor is a resistance element 95 of zigzag form having multiple legs 95a, 95b, 95c, etc. connected in series by means of connections at alternate ends. The whole active element is preferably provided from a unitary sheet. Alternate ends, including preferably the two terminal ends 98, as well as intermediate ends 97, are attached to insulator member 96 which is affixed to the toaster frame adjacent the end at which the spring 55 is located. Intermediate ends 99 are connected to an insulating member 100 which is movable lengthwise relative to the frame. Member 100 is, in turn, provided with a metallic plate 101 having an extension 101a provided with a horizontally extending hook-like tab which is engaged by groove 102 in lever 103 near its upper end. Lever 103 is pivoted at 104 closer to its grooved end than its free end. The free end of lever 103 is provided with a groove 105 and extends through and engages the edge of an eyelet in link 106. Link 106 extends horizontally to a point about half the length of the thermal motor and is provided with another eyelet at its other end through which extends short vertical crank arm 107 by means of a groove engaging the edge of the eyelet. The same crank has a long horizontal crank arm 108 and is pivoted on a flange 109 on the frame. At the end of arm 108 is a hook portion 110 which engages an eyelet in yoke 111. Yoke 111 extends across the end of the toaster structure (see FIGS. 1 and 7) between crank arm 108 and a similar crank arm 108a which similarly engages an eyelet in the opposite end of yoke 111. As can be seen in FIG. 1, yoke 111 is preferably bow-shaped and symmetrical across the end of toaster frame. It is pivotally connected by a loop link 112 to the approximate mid-point of a lever member 113.

One end of lever 113 is pivotally connected by a link 119 to a lever 120 which is pivotally connected at point 121 to piston rod 122, the remote end of which is terminated in piston 122a which functions to compress and release the coil compression spring. The coil spring 123 is confined within a cylindrical container 124 mounted on the toaster frame. Lever 120 is pivoted on the horizontally transverse portion of rod 27 which forms the axis of rotation of the rod. The lever 120 has the same axis of rotation as rod 27 but is free to rotate relative to the rod without rotation of the rod. When rotaing in counter-clockwise direction under the urging of spring 123 through piston assembly 122, the end portion 126 of lever 120 comes into contact with the bottom of rod arm 27a, as shown in FIG. 9, and urges it from the lower toasting position shown in dashed lines into the upper bread-removing position shown in full lines in FIG. 1.

As is best seen in FIGS. 8 and 9, the other end of lever 113 is pivotally connected by a pin 114 to cam lever member 115. The cam lever, in turn, is pivoted to a portion of the frame by pivot 116. A spring 125 interconnects cam lever member 115 and the frame, tending to move portion 115a to the right.

When the thermal motor is deenergized, and lever 113 is in its lowermost position, as shown in FIG. 1, the downward tension on pivot 114 operates against the bias of spring 125, and portion 115a of cam lever 115 is rotated to the left. When the thermal motor is energized, and the tension on lever 113 relaxes, compression spring 123 lifts the lefthand end of lever 113, rotating the lever on pivot 114, which is still held in its lowermost position by the residual tension transmitted through link 112 from yoke 111. When the upward motion of the carriage is halted, either because of having reached the toast-removing position or because of any other interference with its travel, further expansion on the thermal motor removes the downward pull on pivot 114. This permits spring 125 to rotate cam lever member 115 in a counter-clockwise direction on pivot 116, bringing portion 115a into contact with switch actuator 88, shifting it from the position into which it has been snapped by the actuation of electromagnet 51 (i.e., with contacts 46 and 47 closed) back into the position in which contacts 41 and 42 are closed. This deenergizes the thermal motor. Since this action will occur even if the carriage has jammed, for any reason, there is no possibility of the thermal motor being energized for more than a few seconds, and it provides a valuable safety feature.

Operation of the device from toasting position will be understood by reference to FIGS. 1, 3, 7, 8, 9 and 11. As previously described, when the condition of switch 40 is changed by electromagnet 51 so that contacts 41 and 42 are opened and contacts 46 and 47 are closed, the thermal motor elements 48a and 48b are connected across the power supply terminals 44 and thereby energized. Connection into the circuit is made through their terminal ends 98 into the electric circuit as shown by circuit diagram in FIG. 11. As current flows through the elements 95, these elements due to their internal resistance heat and expand. Since they are attached at one end by member 96 to the toaster frame, the slack created by their expansion is taken up at the other end where their ends 99 are attached to insulator 100 connected in turn to metallic plate 101 with an extension 101a having a horizontal tab. Tension is applied at this tab through the chain of linkages and levers previously described by virtue of spring 123. More specifically, the tab on extension 101a releases the pull on the lever 103 thereby allowing the link 106 to move to the left as seen in FIGS. 3 and 7. The linkage associated with thermal motor 48a performs in essentially the same way and thereby permits the clockwise rotation of crank arm 108. Clockwise rotation of crank arm 108 and corresponding rotation of crank arm 108a allow yoke 111 to move upward and this movement permits the lever 113 through the upward movement of link 112 to release the coil spring through link 119, lever 120 and piston assembly 122. The extremes of movement of the linkage system are shown in FIG. 8 where the lowermost position, or the position for the cold thermal motor is shown in full lines and the uppermost position, or energized position, is shown in dashed lines. One end of lever 113 is free to rise to the upper position shown in FIG. 8 wherein the piston 122a has been urged upwardly by the expansion of the coil spring due to energy stored in its compressed state. Thus the coil spring acts through piston 122a and its piston rod 122 and pin 121 to effect rotation of lever 120. This rotation causes lever 120 to first contact and then urge upward rod lever arm 27a. Since the end of arm 27a is connected by means of spring 76 to link 74 which is pivotally connected to the carriage, raising the arm 27a will also raise the carriage.

As previously described, when the upward travel of the carriage is arrested, cam lever 115 shifts the double throw switch to deenergize the thermal motor and to close contacts 41, 42. Normally this action occurs when the carriage has reached toast-removing position, and the closure of contacts 41, 42 will not energize the heating element because contacts 35, 36 are opened as soon as the carriage leaves toasting position. The same thing is true if the carriage is unexpectedly arrested in the course of its upward movement.

Should the carriage fail to rise at all, for any reason, the slot 75 allows a limited movement of arm 27 against the urging of the tension spring 76. When the arm reaches the top of slot 75 and can go no farther, spring 125 will rotate cam lever 115 on pivot 116 as previously described, thus shifting the double-throw switch. If switch 35, 36 is still in closed position, the heater elements will be reenergized. After a short time the thermostat will reverse the double throw switch, which will then alternately cycle the thermal motor and the heater elements until the obstruction is cleared.

Once the position of switch 40 is changed, the thermal motor begins to cool and returns to its initial position. In doing so it reverses the movement by which spring 123 took up its slack, exerting a pull through lever 103 on link 106 and hence on crank 108 to lower the yoke 111 and hence the lever 113 and thus compress the spring, thereby storing its energy. As the thermal motor cools and the linkage system causes the spring to be compressed and the rest of the structure to retract from the position of the energized thermal motor, the lever arm 27a is not withdrawn. Instead, lever 120 is withdrawn leaving the carriage in its uppermost or bread-removing position. It will remain in this position due to the effect of latching plate 56 under the influence of spring 58 until again released by the latch system of FIGS. 3 and 4. However, until the bread is removed from the toaster well, the lever 60 is not able to return from the position of FIG. 4 to the full line position of FIG. 3 and hence the shoulder 69 of the tension wire 64 remains disengaged from crank 67. However, after the carriage has risen, when the toast is removed portion 62 will rise from the position shown in dash-lines to the position shown in full lines in FIG. 3 under the urging of the resilient spring effect of wire 64 until stress is removed and the wire 64 assumes the essentially straight path shown in FIG. 3. As the lever 60 rises, the wire moves also until the shoulder passes back through the aperture in the flange 66 and re-engages the shoulder formed by the backside of the flange. Thereafter the latch release assembly is again ready for operation upon insertion of another piece of bread into the bread well.

To some extent it has been indicated above that a wide range of variation is possible in structure in the practice of the present invention. Many areas of variation will occur immediately to those skilled in the art. One area which lends itself to great modification is that of the selector switch actuation. With modification of linkages many variations are possible. A modified construction of the cam arrangement for actuation of the selector switch without material alteration in other respects is shown in FIG. 10, wherein the action of this structure is also illustrated. In this version parts corresponding to those in the structure of FIGS. 1–9 are indicated by numbers corresponding to those used in FIGS. 1–9 but with the addition of primes thereto. In the FIG. 10 construction instead of the separate cam lever 115, the cam member 130 is made integral with the end of the lever 113'. Lever 113' is therefore fixed directly by pivot 131 to a portion of the frame. Cam member 130 is so arranged that in its uppermost position it will permit member 45' to move to a position in which contacts 46' and 47' are closed. When, however, the upward travel of the lefthand end of lever 113' is arrested, a further relaxing of the thermal motor tension on lever 113' will permit spring 132 to shift the lever to the right, such movement being made possible by the slot 133 in which pivot 131 is located. This movement will shift the double-throw switch as previously described.

Other modifications in structure within the scope of the present invention are also possible. For example, instead of a thermal motor, in accordance with the present invention a toaster may use any motor means which together with suitable linkages or other mechanical connections and suitable circuitry will serve to alternately stress a spring and release and use the energy stored in the stressed spring to raise the carriage. Examples of other possible motor means are solenoids and rotary motors. Suitable mechanical linkage systems both between the motor means and the carriage actuating spring and between said spring and the carriage are subject to modification for each system employed. Even with thermal motors with the same or different orientation on the toaster frame considerable variation is possible.

All modifications within the scope of the claims are intended to be within the scope and spirit of the invention.

I claim:

1. In an automatic bread toaster having a frame including at least one bread receiving well, bread carriage means within said well movable between a toasting position at the lower part of the well and a higher bread removal position, spring means adapted to effect movement of the carriage from one position to the other in the course of releasing stored energy, means acting alternately to stress and release stored energy in the spring means, including motor means which, upon energization, releases the spring means so that the spring means is able to apply its stored energy to move the carriage, a switch in circuit with said motor means, means for closing said switch and thereby causing the carriage to move under the urging of said spring, switch actuating means operatively connected with said carriage to open said switch effective only as a result of interference with the movement of the carriage at any point in its travel under the urging of said spring, and means for holding said switch actuating means inoperative as long as the carriage moves under the urging of said spring.

2. The toaster of claim 1 in which latch means is provided to hold the toaster carriage in the position to which it is moved by the spring means against the force of gravity.

3. The toaster of claim 1 in which the motor means is a thermal motor which produces motion by expansion upon heating and contraction upon cooling and which is heated to produce expansion by its internal resistance to current flow.

4. The toaster of claim 3 in which the spring means is a coil spring arranged to be compressed to effect a storage of energy upon cooling of the thermal motor.

5. The toaster of claim 3 in which thermostatic means is provided to initiate energization of the thermal motor upon completion of toasting.

6. The toaster of claim 5 in which a switch is provided in circuit with the motor means to control its energization and an actuator responsive to the thermostat is provided to close this switch.

7. The toaster of claim 5 in which manual means is additionally provided for energizing the motor means to raise the carriage from the bread toasting to the bread removing position without the use of the thermostat.

8. In an automatic bread toaster having a frame including at least one bread receiving well, bread carriage means within said well movable between a toasting position at the lower part of said well and a higher bread removing position, spring means adapted to effect movement of the carriage from its lower toasting position upward toward bread removing position in the course of releasing stored energy, means acting alternately to stress and release stored energy in the spring means, including motor means which upon energization releases the spring means to permit the spring means to raise the carriage, a switch in circuit with said motor means, means operable at the end of the toasting operation to close said switch and thereby cause the carriage to rise, cam means operatively connected with said carriage to open said switch effective only as a result of interference with the upward movement of the carriage at any point in its upward travel from toasting position, and means for holding said cam means inoperative as long as the carriage is moving upward.

9. The toaster of claim 8 in which latch means is provided to hold the carriage in the bread removing position to which it is moved by the spring means against the force of gravity.

10. The bread toaster of claim 8 in which the switch which is opened to deenergize the motor means is closed upon completion of the toasting cycle by a thermally responsive means to energize the motor means.

11. The toaster of claim 10 in which the thermally responsive means includes a thermostat that acts to energize a solenoid actuator which acts to close the switch in circuit with the motor means.

12. The bread toaster of claim 11 in which manual means is additionally provided for energizing the motor means to raise the carriage from bread toasting to bread removing position without the use of the thermostat.

13. The bread toaster of claim 8 in which the motor means is a thermal motor which responds by expansion upon heating and contraction upon cooling, the heating being produced by the internal resistance of the unit to current flowing through it.

14. The bread toaster of claim 13 in which the spring means is a coil compression spring adapted to be compressed to effect a storage of energy by the action upon cooling of the thermal motor.

15. In a bread toaster having a frame including a rod member, a bread carriage movable relative to the frame from a bread toasting to a bread removal position, releasable means for retaining the carriage in bread removal position comprising an apertured plate pivotally supported on the carriage and having an aperture through which the rod passes, the edges of which plate, when the plate is rotated to a predetermined angle to the rod, will engage the rod and prevent movement of the toaster carriage in one direction, means biasing the apertured plate into a position in which it engages the rod, and means responsive to the insertion of a bread slice on the carriage to move the apertured plate to a position where no engagement occurs thereby permitting the carriage to move to toasting position under the influence of gravity.

16. In an automatic bread toaster having a frame including at least one bread receiving well, bread carriage means within said well movable between a toasting position at the lower part of the well and a higher bread-removal position, a lever pivotally connected to power means at a point between its two ends, a spring adapted to lift said carriage from the toasting position interconnected with one end of said lever arranged to be stressed when the power means is deenergized and to be released to lift the carriage when the power means is energized, the other end of said lever supporting a cam member which is pivotally connected to the frame and a second spring interconnecting said lever and said frame arranged to move said cam member to actuate a selector switch when the upward motion of the carriage is arrested at any point in its travel thereby deenergizing said power means.

17. A bread toaster having a frame including at least one bread-receiving well, bread carriage means within said well movable between a toasting position at the lower part of the well and a higher bread-removal position, latching means engagable between the carriage and the frame when the carriage is in bread-removal position to prevent lowering of the carriage under the influence of gravity, release means comprising a lever pivotally supported on the carriage positioned to be depressed by the weight of a bread slice placed on the carriage, coupling means connected to the lever and to the latching means, said coupling means including a flexible wire having a transverse shoulder which engages a shoulder on a member which releases the latching means, means on the frame to urge the shoulder on the wire out of engagement with the shoulder on the member, and resilient means urging the member toward latching position.

18. The system of claim 17 in which the shoulder on the wire is a transverse bend between two parallel portions of the wire and the shoulder on the member which releases the locking means is one edge of a slot in the plane of the wire and longer than the bend and the means on the frame is a stop so located that it is effective when the carriage is in toasting position to bend the flexible wire upward to release engagement between the shoulders and to cause the wire to slide through the slot, whereby the shoulders will not reengage until the bread slice is removed and the resilient means returns the wire to its initial position.

19. The toaster of claim 8 in which the toaster heater element is energized from the same source as the motor, and a selector switch is provided to be in circuit alternately with the motor or the toaster heater element.

20. The toaster of claim 19 in which means is provided to actuate the selector switch to be in circuit with the toaster heating element as the carriage moves to its bread removing position, and additional switch means in circuit with said selector switch is positioned and adapted to be closed when the toaster carriage is in toasting position and opened when the toaster carriage is out of toasting position.

21. The toaster of claim 19 in which thermostatically operated switch means is provided to energize means adapted to actuate the selector switch whereby the motor means is energized and the toaster heater element deenergized.

22. The toaster of claim 21 in which a manually operated switch is provided in parallel with the thermostatically operated switch in order to manually discontinue the toasting process, energize the thermal motor and thereby immediately raise the carriage.

23. In an automatic bread toaster having a frame including at least one bread receiving well, heating elements on opposite sides of said well, bread carriage means within said well movable between a toasting position at the lower part of said well and a higher bread removing position, spring means adapted to effect movement of the carriage from its lower toasting position upward toward bread removing position in the course of releasing stored energy, means acting alternately to stress and release stored energy in the spring means, including motor means which upon energization releases the spring means to permit the spring means to raise the carriage, said motor means and said heating element being energized from the same source, a single pole double-throw selector switch arranged to be in circuit alternately with the motor or the heating elements, and cam means to actuate said switch to open the motor energizing contacts when there is any interference with the upward movement of the carriage.

24. The toaster of claim 23 in which the selector switch employed is a snap action switch with two pairs of switch contacts, one contact of each pair being stationary and supported facing one another on spaced fixed blades and the other contacts of each pair being supported on opposite sides of a flexible blade in positions such that by movement of the blade each pair of contacts may be alternately closed, insulating means separating the blades, means holding the blades together in the region of the insulation, a flexible actuator also supported between the fixed blades and connecting spring means between the actuator and the middle flexible blade whereby the flexible blade tends to be urged away from the actuator and whereby movement of the free end of the actuator past the plane of the flexible blade will cause the spring to snap the actuator from a position in which one pair of contacts is closed to a position in which the other pair of contacts is closed.

25. The toaster of claim 23 in which the motor means is a thermal motor and the cam is part of the linkage system between the thermal motor and the carriage lifting spring.

26. The toaster of claim 14 in which the compression spring is contained within a tubular container supported on the frame, the thermal motor is connected to the compression spring through a suitable linkage, and a disengagable linkage is provided between the spring means and the carriage lifting structure which permits application of force to lift the carriage, and compression of the spring means without movement of the carriage.

27. In a toaster, two thermal motors arranged longitudinally to extend along opposite sides of the toaster, both being connected at one end of the toaster to the frame and the free ends of both motors being connected to a linkage system including a lever pivoted on the toaster frame at one side and extending across the end of the toaster, and means connecting the free end of said lever with means for compressing a spring when the thermal motor is deenergized.

28. The toaster of claim 27 in which the linkage mechanism associated with each thermal motor includes a vertically arranged lever pivoted at tits middle and whose upper end is connected to the unattached end of the thermal motor and whose lower end is connected through a link to the short vertical leg of a crank whose long horizontal leg extends to the other end of the toaster, yoke means extending between the ends of the long horizontal legs, a spring compression member, and suitable means connecting said yoke to said spring.

29. The toaster of claim 28 in which the yoke is connected by a link to the middle of said lever.

30. The toaster of claim 29 in which the lever supports a cam member to actuate a selector switch.

31. The toaster of claim 30 in which the cam is a separate pivotable member actuable by the lever.

32. The toaster of claim 30 in which the cam is rigidly fixed relative to the lever.

33. In an automatic bread toaster having a frame including at least one bread-receiving well, bread carriage means within said well movable between a toasting position at the lower part of the well and a higher bread-removal position, thermal motor means pivotally connected to a lever at a point between its two ends, a first spring interconnected with one end of said lever adapted to lift the carriage from toasting position arranged to be stressed when the thermal motor is energized, a cam interconnected with the other end of said lever, a switch controlling the energization of said thermal motor, means for closing the contacts of said switch to energize the thermal motor, and means including a second spring responsive to the relaxing of stress from said thermal motor on said other end of the lever to move the cam into engagement with said switch to open its contacts.

34. The toaster of claim 33 wherein said cam is pivotally mounted on the frame and said other end of the lever is pivotally connected with the cam, the pivots being so positioned as to cause rotation of the cam out of engagement with said switch when the thermal motor is contracted.

35. The toaster of claim 33 wherein the cam is fixedly attached to the lever, and said other end of the lever is pivotally attached to the frame in such manner that an expansion of the thermal motor will permit the lever to move in a direction to cause engagement of the cam with said switch under the influence of said second spring.

36. The toaster of claim 33 including lost-motion means arranged between said first spring and said carriage whereby said one end of the lever can move to an extent limited by said lost-motion means after the movement of the carriage is arrested.

References Cited in the file of this patent

UNITED STATES PATENTS

| | | |
|---|---|---|
| 966,665 | Deppen | Aug. 9, 1910 |
| 2,835,192 | Sivacek | May 20, 1958 |
| 2,842,787 | Murray et al. | July 15, 1958 |
| 2,877,702 | Turner | Mar. 17, 1959 |
| 2,920,550 | Schmall et al. | Jan. 12, 1960 |
| 2,920,551 | Schmall | Jan. 12, 1960 |